US012620278B2

(12) United States Patent
Schlegel et al.

(10) Patent No.: US 12,620,278 B2
(45) Date of Patent: May 5, 2026

(54) METHOD, APPARATUS AND SYSTEM FOR DETECTING ABNORMAL OPERATING STATES OF A DEVICE

(71) Applicant: Bayerische Motoren Werke Aktiengesellschaft, Munich (DE)

(72) Inventors: Bernhard Schlegel, Munich (DE); Philipp Reinisch, Kirchseeon (DE); Christoph Weidner, Waldmuenchen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 286 days.

(21) Appl. No.: 17/771,798

(22) PCT Filed: Sep. 23, 2020

(86) PCT No.: PCT/EP2020/076478
§ 371 (c)(1),
(2) Date: Apr. 25, 2022

(87) PCT Pub. No.: WO2021/121695
PCT Pub. Date: Jun. 24, 2021

(65) Prior Publication Data
US 2023/0013544 A1 Jan. 19, 2023

(30) Foreign Application Priority Data
Dec. 20, 2019 (DE) ..................... 10 2019 135 608.3

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01); *G07C 5/085* (2013.01)

(58) Field of Classification Search
CPC .................................................... G07C 5/0808
(Continued)

(56) References Cited

U.S. PATENT DOCUMENTS 10,169,932 B2 1/2019 Ishikawa et al.
2010/0161274 A1* 6/2010 Leao ................. G05B 23/0243 702/182
(Continued)

FOREIGN PATENT DOCUMENTS

CN 1768311 A 5/2006
CN 102902873 A 1/2013
(Continued)

OTHER PUBLICATIONS

International Search Report corresponding to International Patent Application No. PCT/EP2020/076478, dated Dec. 23, 2020 (4 pages).
(Continued)

*Primary Examiner* — Helal A Algahaim
*Assistant Examiner* — Michael T Dowling
(74) *Attorney, Agent, or Firm* — Maginot, Moore & Beck LLP

(57) ABSTRACT

A method for detecting abnormal operating states of a device includes obtaining model data to the device that is representative of operating states to be expected for at least one component of the device. The device collects measurement data that is representative of an actual operating state of the component of the device. The device ascertains comparison data on the basis of the model data and the measurement data, where the comparison data is representative of an expected operating state. The method includes using the comparison data and the measurement data as a basis for determining whether there is a discrepancy between the actual operating state and the expected operating state. The
(Continued)

method further includes attributing an abnormal operating state to the at least one component in a manner corresponding to a time of collection of the measurement data on the basis of the discrepancy.

14 Claims, 2 Drawing Sheets

(58) Field of Classification Search
USPC ........................................................ 701/31.4
See application file for complete search history.

(56) References Cited

U.S. PATENT DOCUMENTS

| | | | | |
|---|---|---|---|---|
| 2013/0030765 | A1* | 1/2013 | David | G05B 23/024 702/183 |
| 2016/0339926 | A1 | 11/2016 | Ballmann et al. | |
| 2018/0315260 | A1* | 11/2018 | Anthony | G06N 5/022 |
| 2019/0311558 | A1 | 10/2019 | Bika et al. | |
| 2021/0090358 | A1* | 3/2021 | DiCarlo | G07C 5/0808 |

FOREIGN PATENT DOCUMENTS

| | | | |
|---|---|---|---|
| DE | 102012106572 | A1 | 1/2013 |
| DE | 102016202569 | A1 | 8/2017 |
| DE | 202017005070 | U1 | 11/2017 |
| DE | 102018116696 | A1 | 3/2019 |
| EP | 3113529 | A1 | 1/2017 |
| EP | 3370389 | A1 | 9/2018 |
| JP | 2000010620 | A | 1/2000 |
| WO | 2011086805 | A1 | 7/2011 |
| WO | 2018204253 | A1 | 11/2018 |

OTHER PUBLICATIONS

German Search Report corresponding to German Patent Application No. 10 2019 135 608.3, dated Nov. 23, 2020 (6 pages).
Biloš, Marin, Bertrand Charpentier, and Stephan Gunnemann. "Uncertainty on asynchronous time event prediction." Advances in Neural Information Processing Systems 32 (2019). (10 Pages).
Chinese Office Action corresponding to Chinese Patent Application No. 202080074167.6, dated Jun. 12, 2023 (8 pages).
English Translation Chinese Office Action corresponding to Chinese Patent Application No. 202080074167.6, dated Jun. 12, 2023 (11 pages).

* cited by examiner

METHOD, APPARATUS AND SYSTEM FOR DETECTING ABNORMAL OPERATING STATES OF A DEVICE

The present application is the U.S. national phase of PCT Application PCT/EP2020/076478 filed on Sep. 23, 2020, which claims priority of German patent application No. 102019135608.3 filed on Dec. 20, 2019, which is incorporated herein by reference in its entirety.

TECHNICAL FIELD

The disclosure relates to a method for detecting abnormal operating states of a device, in particular a motor vehicle, and to a corresponding device and a corresponding system. Furthermore, a corresponding computer program and storage medium are specified.

BACKGROUND

Motor vehicles today have a multiplicity of vehicle functions, including not only basic comfort functions, assistance settings or driving-dynamics settings but also safety-critical functions that permit for example the automated performance of driving maneuvers, in particular semiautonomous or fully autonomous driving.

As the complexity of the vehicle functions increases and the degree of networking of said functions becomes greater and greater, the volume of data collected and interchanged during operation of the individual vehicle functions increases. When this happens, it becomes more and more difficult for abnormal operating states, i.e. errors and deviations from specification during the operation of the individual vehicle functions, to be detected and evaluated by way of manual modeling.

Manual modeling in this case refers to the creation of a state machine on the basis of the vehicle specifications that is used to model all setpoint operating states of individual components of the motor vehicle. A component here and below refers both to individual software and hardware elements of the motor vehicle and to a combination of multiple software and/or hardware elements of the motor vehicle that each implement one or more vehicle functions. During the operation of the motor vehicle, the collected data interchanged on a bus system of the motor vehicle are normally recorded; depending on the vehicle function or the component, these may be diagnostic data such as status or error signals, control signals for controlling or regulating individual components, or data that are representative of recorded measured values such as for example speed or steering angle of the motor vehicle. All of the aforementioned collected or interchanged data are referred to as measurement data below. Following operation of the motor vehicle, the entire recorded volume of measurement data can then be read in order to check said data for discrepancies in respect of the setpoint operating states on the basis of one or more models.

One object on which the disclosure is based is to provide an efficient and reliable method for detecting abnormal operating states of a motor vehicle. Furthermore, it is an aim to specify a corresponding apparatus, a corresponding system and a computer program and storage medium.

SUMMARY

The object, as well as others, are achieved by at least one embodiment disclosed herein.

According to a first aspect, the disclosure relates to a method for detecting abnormal operating states of a motor vehicle.

The method comprises the steps of:

a) providing model data to the motor vehicle, which are representative of operating states to be expected for at least one component of the motor vehicle;

b) collecting measurement data by way of the motor vehicle, which are representative of an actual operating state of the at least one component of the motor vehicle;

c) ascertaining comparison data by way of the motor vehicle on the basis of the model data and the measurement data, which are representative of an expected operating state;

d) taking the comparison data and the measurement data as a basis for checking whether there is a discrepancy between the actual operating state and the expected operating state; and e) attributing an abnormal operating state to the at least one component in a manner corresponding to a time of collection of the measurement data on the basis of the discrepancy.

The model data are in particular representative of a statistical model that in each case indicates a most probable next operating state of the at least one component on the basis of an initial state, or the operating states already encountered, of the at least one component. The most probable next operating state is also referred to as the expected operating state and represented by the comparison data ascertained in step c).

The statistical model that can be considered is preferably a (deep) artificial neural network. An operating state can be understood to mean in particular any action by the respective component that is represented by the output of appropriate measurement data, and also the absence of an action by the respective component. The discrepancy can be ascertained in step d) by using for example a distance-based method such as "k-nearest neighbors" (kNN), "local outlier factor" (LOF), "[hierarchical]-density-based spatial clustering of applications with noise" ([H]-DBSCAN) or "ordering points to identify the clustering structure" (OPTICS), an ensemble-based method such as "isolation forest" (IF), a statistical method such as "Gaussian mixture models" (GMM), "independent component analysis" (ICA) or "vector auto-regressive" (VAR), a domain-based method such as "[one-class] support vector machine" ([OC]-SVM) or a reconstruction-based method such as "extreme learning machines" (ELM).

Steps d) and e) can be performed in particular in accordance with the method "uncertainty on asynchronous time event prediction" presented in "Advances in Neural Information Processing Systems", 2019, pages 12831-12840, by Bertrand Charpentier, Marin Biloš and Stephan Günnemann and also at the "Neural Information Processing Systems" conference in 2019.

Advantageously, the method according to the first aspect allows detection of abnormal operating states of the motor vehicle during operation of the motor vehicle, in particular in real time. This advantageously allows transfer of the entire volume of measurement data to be dispensed with, or transfer to be limited to measurement data that correspond to an abnormal operating state of at least one component. Moreover, it is conceivable for appropriate measures to be taken during the actual operation of the motor vehicle if an abnormal operating state of a safety-relevant vehicle function has been identified, which means that it is possible to contribute to a particularly safe driving mode of the motor vehicle.

Instead of a motor vehicle, the aforementioned method can also be used for other apparatuses (also referred to as "device" below) equipped with appropriate sensors, in order to monitor operating states of the respective apparatus. All features disclosed here and below in connection with a motor vehicle can also be applied to such apparatuses mutatis mutandis.

In one advantageous configuration according to the first aspect, a vehicle function to be evaluated is specified to the motor vehicle before step c), and the vehicle function to be evaluated and the measurement data are taken as a basis for ascertaining filtered measurement data. The filtered measurement data are used to ascertain the comparison data in step c).

In particular, the measurement data are filtered in such a way that now only measurement data from components involved in the operation of the vehicle function to be evaluated are covered by the filtered measurement data.

In a further advantageous configuration according to the first aspect, steps b) to d) are each performed at multiple successive times. If a discrepancy between the actual operating state and the expected operating state is ascertained at each of at least N successive times, the abnormal operating state is attributed to the at least one component in a manner corresponding to the N successive times in step e), N being a natural number greater than 1, in particular greater than 5, preferably greater than 10.

In other words, only a repeated discrepancy between the actual operating state and the expected operating state leads to a categorization as an abnormal operating state.

In a further advantageous configuration according to the first aspect, if an abnormal operating state is attributed to the at least one component, the measurement data corresponding to the abnormal operating state are stored and/or output in a step f) that follows step e).

In this regard, measurement data that do not correspond to an abnormal operating state can, in particular, be rejected after they are collected, with the result that a subsequent evaluation can be simplified and/or a memory requirement can be reduced.

In a further advantageous configuration according to the first aspect, step a), according to a second aspect, comprises:

- providing operating data of one or more motor vehicles to a computer center,
- specifying a vehicle function to be evaluated to the computer center and ascertaining filtered operating data on the basis of the vehicle function to be evaluated and the operating data,
- ascertaining model data by training a model on the basis of the filtered operating data for the vehicle function to be evaluated, and
- providing the ascertained model data to the motor vehicle.

The operating data provided to the computer center are in particular historical operating data, for example bus signals recorded during test drives by a multiplicity of motor vehicles.

Advantageously, the method according to the second aspect allows automatic generation of a model for detecting abnormal operating states of the motor vehicle. In contrast to manual modeling, this does not require knowledge of all errors that might occur, in particular, which means that it is possible to contribute to reliability for the detection of abnormal operating states and to a safe driving mode of the motor vehicle.

In a further advantageous configuration according to the second aspect, the measurement data corresponding to the abnormal operating state are transferred to the computer center in step f).

By way of example, the apparatus may be coupled to the computer center for signaling purposes in this regard, for example by reading the apparatus during a workshop visit by the motor vehicle or by way of an Internet connection.

In a further advantageous configuration according to the first or second aspect, the model data are representative of an artificial neural network. This is preferably a deep artificial neural network. Such models are advantageous in particular for measurement data that are available as continuous time series with nonequidistant measured values.

According to a third aspect, the disclosure relates to an apparatus for detecting abnormal operating states for a motor vehicle. The apparatus is configured to perform a method according to the first aspect. In this regard, the apparatus has, in particular, an associated component for collecting measurement data, an associated receiving unit for receiving provided model data and an associated computing unit for processing the data.

According to a fourth aspect, the relates to a system for detecting abnormal operating states of a motor vehicle. The system comprises a computer center and a motor vehicle having an apparatus according to the third aspect. The system is configured to perform a method according to the first or second aspect.

According to a fifth aspect, the disclosure relates to a computer program comprising instructions that, when the computer program is executed by a computer, cause said computer to perform the method according to the first or second aspect.

According to a sixth aspect, the disclosure relates to a computer-readable storage medium on which the computer program according to the fifth aspect is stored.

BRIEF DESCRIPTION OF THE DRAWINGS

Exemplary embodiments are explained in more detail below with reference to the schematic drawings, in which.

DETAILED DESCRIPTION

Elements having the same design or function are provided with the same reference signs throughout the figures.

Large volumes of data already flow through vehicles today, which data can be recorded during the journey and evaluated after the journey in order to detect malfunctions, for example.

The volume and complexity of the data will increase further in future vehicle generations. It is thus no longer feasible to collect all of the data and to analyze them individually by means of manually created models. This is true in particular because not all errors are known in advance.

On the basis of this, data processing by means of a neural network is proposed below.

Future systems are reliant on artificial intelligence or deep learning (DL). Here, neural networks learn independently from large volumes of data and are capable of automatically identifying anomalies and errors. The core component is a deep neural network, which is capable of predicting future signals and the value thereof on the basis of historical data. Repeated discrepancies between the prediction and the actual value indicate abnormal states and can therefore be detected and evaluated.

These models can be used live in the vehicle. This merely requires the abnormal situations to be read and stored in a specific manner after the journey. This reduces the effort for data transmission and analysis considerably.

Models are advantageously generated automatically on the basis of historical data. Problems do not need to be known explicitly beforehand. A live evaluation during the journey is furthermore facilitated. Finally, only data from discrepancies now need to be evaluated.

Figure 1:
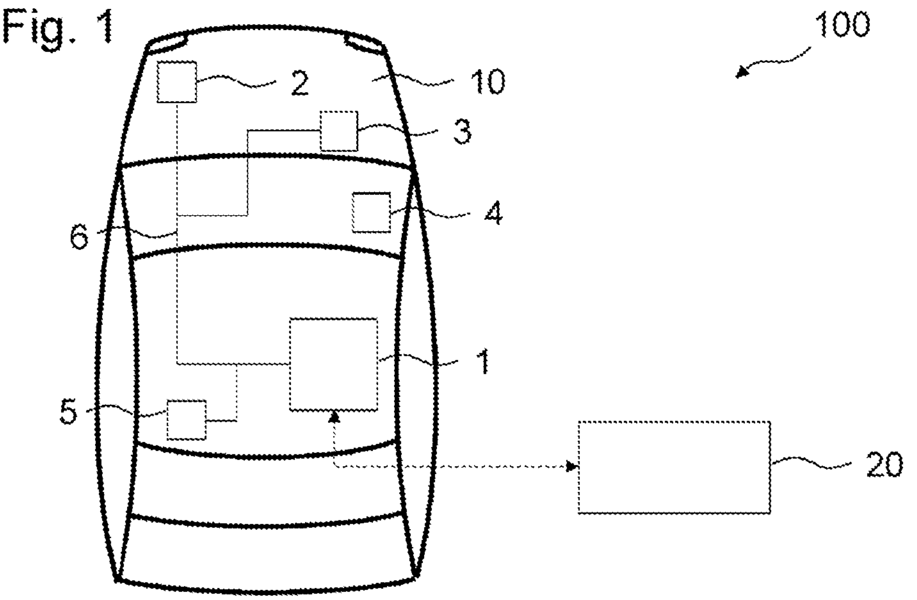
FIG. 1 shows a system for detecting abnormal operating states of a motor vehicle.

FIG. 1 shows a system 100 for detecting abnormal operating states of a motor vehicle 10. Besides the motor vehicle 10, the system 100 comprises a computer center 20, which, by way of illustration, is coupled to a multiplicity of further motor vehicles (not shown) for signaling purposes in order to evaluate their operating data.

The motor vehicle 10 has an associated apparatus 1 for detecting abnormal operating states that is able to be coupled to the computer center 20 for signaling purposes (indicated by the dashed arrow). The apparatus 1 is for example a so-called mobile data recorder (MDR). Moreover, the motor vehicle 10 has multiple components 2, 3, 4, 5 that are connected to the apparatus 1 via a vehicle bus 6, for example.

By way of example, the component 2 is a speed sensor, the component 3 is a steering angle sensor, the component 4 is a radar sensor and the component 5 is a window lifter. By way of illustration, the components 2-4 are needed in order to implement the vehicle function F "adaptive cruise control", while the component 5 has no influence on this vehicle function F.

Figure 2:
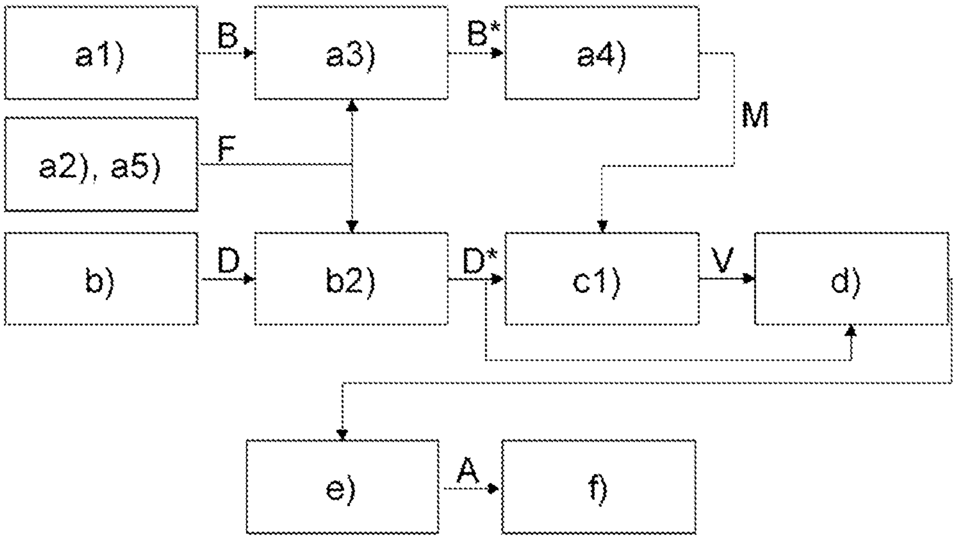
FIG. 2 shows a method for detecting abnormal operating states of a motor vehicle as shown in FIG. 1.

The system 100 is configured to perform a method for detecting abnormal operating states A, as explained in more detail below with reference to the schematic flowchart in FIG. 2:

First of all, historical operating data B of all components 2-5 of a multiplicity of motor vehicles, which are representative of a trend in operating states of the applicable components 2-5, are provided to the computer center 20 in a step a1). In addition, the vehicle function F "adaptive cruise control" to be evaluated is specified to the computer center 20 in a step a2).

On the basis of the historical operating data B, for example the computer center 20 then ascertains filtered operating data B*, which now comprise only historical operating data of the components 2-4 involved in the vehicle function F, in a step a3).

In a subsequent step a4), the computer center 20 trains an artificial neural network (ANN) on the basis of the filtered operating data B* and for example outputs hyperparameters of the ANN as model data M to the apparatus 1 of the motor vehicle 10. In addition, the vehicle function F "adaptive cruise control" to be evaluated is specified to the motor vehicle 10 in a step a5).

In a step b), measurement data D of the components 2-5 of the motor vehicle 10 are provided to the apparatus 1. The measurement data D in each case are an item of operating data, comparable with one of the items of historical operating data B, that is representative of a current or actual operating state of the respective component 2-5 of the motor vehicle 10.

In a subsequent step b2), the vehicle function F to be evaluated and the measurement data D are taken as a basis for ascertaining filtered measurement data D* by way of the apparatus 1, which now comprise only measurement data D of the components 2-4 that are involved in the vehicle function F.

In a step c1), comparison data V are ascertained by the apparatus 1 on the basis of the model data M and the filtered measurement data D*, which are representative of an expected operating state of the applicable components 2-4.

In a step d), the comparison data V and the filtered measurement data D* are taken as a basis for checking whether there is a discrepancy between the actual operating state and the expected operating state.

Steps b) to d) can each be performed at multiple successive times, for example. If a discrepancy between the actual operating state and the expected operating state is ascertained at each of at least 5 successive times, an abnormal operating state is attributed to the applicable component 2-4 in a manner corresponding to the respective successive times in a subsequent step e), that is to say that only repeated discrepancies are rated as abnormal operating states.

Alternatively, an abnormal operating state is attributed to the respective component 2-4 in step e) in the event of just a single detected discrepancy in a manner corresponding to a time of collection of the measurement data D on the basis of the discrepancy.

Finally, in a step f), the apparatus 1 stores and/or outputs those measurement data D that correspond to an ascertained abnormal operating state. Measurement data D that do not correspond to an abnormal operating state can be rejected. By way of illustration, the remaining measurement data D are transferred to the computer center in step f).

As a departure from the design shown using FIG. 1 or the method outlined using FIG. 2, it is likewise possible, in a further configuration, for the communication in the vehicle to take place on multiple different bus systems, as explained below. All features disclosed in connection with the configuration outlined below are conceivable for an application in the design shown using FIG. 1 or in the method outlined using FIG. 2. According to the further configuration, every single system is used for the data interchange of different functions and vehicle components. These different bus systems can all be read by the MDR. In doing so, the latter interprets all of the signals that occur and processes them further. It can firstly execute different analysis machines on the MDR or transmit the most important information to the computer center in bundled form.

The entire anomaly detection can moreover consist of multiple different program parts. By way of illustration, these can firstly perform different tasks, and secondly they can be executed on different components. By way of illustration, the respective applications are split into two different programming languages. If necessary, an already existing application that processes the data on the MDR further may have been developed in the programming language Java, while the program part that performs the anomaly detection and trains the different application models may be implemented using Python. Python is the currently most widely used programming language for machine learning (ML). The language provides different libraries that support the data preprocessing and the actual performance of the prediction. To implement a deep learning (DL) application and/or to develop the prediction model, it is possible to use the framework "TensorFlow", for example, which models a multiplicity of supporting methods and already predefined process structures and is therefore particularly suitable for the application.

Figure 3:
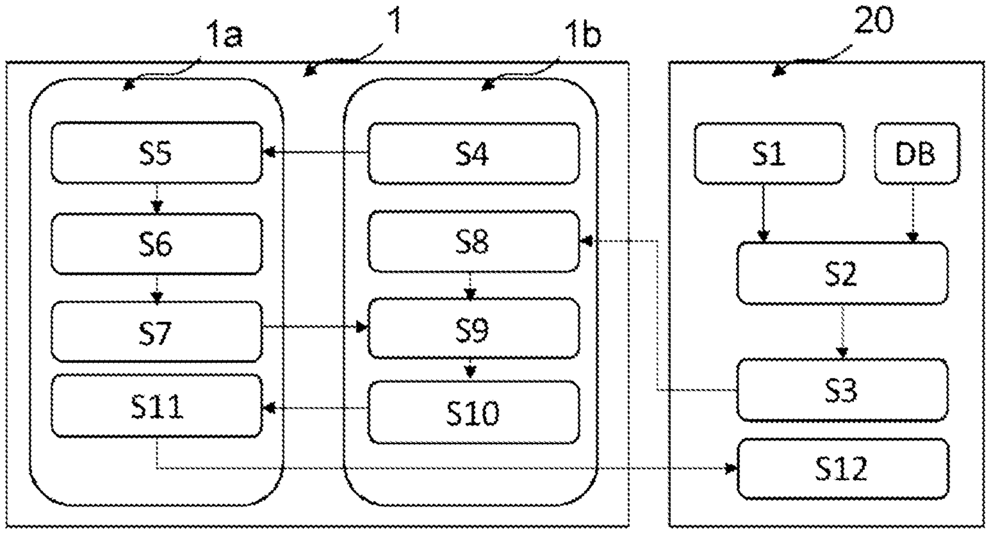

FIG. 3 shows an illustrative semantic design of the communication between the different program parts. The three different applications are also discernible and the split of said applications over the different components. First, the creation of an anomaly detection model (S1, "create a model for AD") by the vehicle manufacturer is shown on the right-hand side of FIG. 3. Said model is created independently for each use case and trained (S2, "train the model") using the stored data from the database DB and optimized (S3, "optimize the model"). In order to be able to perform the actual analysis of the data on the MDR, a model needs to be created that analyzes the individual signals. To be able to create the best possible model for the different types of use cases, these are specifically developed for each individual use case. The model is trained using the training data for the specific use case. This training is then likewise performed again with different parameter configurations. These are for example so-called hyperparameters that have already been stipulated manually before the start of training, in order to configure the respective model. By way of example, a class diagram of all of the components is split into three different packages. Under the actual source code directory are the executing classes that start and manage different types of execution. Also, there is an object, which defines all of the parameters of the model and thereby permits simple initialization of the model class, that maps the actual model. All of the preprocessing steps that are needed for the data for analysis are performed here. In addition, the model used is initialized and ultimately the actual training of the model is performed on the basis of the data and the model configuration. Different models having different model configurations in a class are trained in succession. These created models are then compared using the results of the individual models. This method is also referred to as grid searches and ultimately provides the best model configuration for the trained use case. For the purpose of data processing and visualization, stored data are called from the model class and conditioned. For anomaly detection, the two models "Dirichlet" and "Gaussian" are provided, which define two different variants for how the model can be created.

The left-hand part of FIG. 3 shows the two applications 1*a*, 1*b* that are executed on the MDR. First, the actual onboard analysis (S9, "receive signals and analyze using model") is there in the Python application 1*b*. Said analysis performs the anomaly detection using the trained model in the car and provides the results of the anomaly detection. In addition, there is another application that defines the signals required for the analysis (S4, "configure the use case of the analysis") and forwards said signals to the Java application 1*a* on the MDR.

The application 1*b* is executed on the MDR in the vehicle and consists of two different components. One of these is responsible for transferring a Json configuration file defining the different use cases of the respective models. This file is transmitted to the Java component on the MDR, where it is processed further as described below. The purpose of this transmission is that it means that the Java component, the application 1*a*, does not need to be changed again. This has the advantage that a new JAR file does not need to be generated for every change of the use cases, as said file includes the configured signals, but rather the Java application does not need to be changed again after a one-off initialization on the system. The Python application 1*b* needs to be extended by the newly trained model anyway should the signals to be monitored change. For this reason, the information in a component is bundled and then transmitted from said component to the actual place of use, the Java application 1*a*. The second software component of the application 1*b* performs the actual onboard anomaly detection on the MDR. This application is started from the Java component on the MDR. When the application starts, the trained models for the anomaly detection are loaded from a configured directory (S8, "provide model on MDR"). Additionally, discretization rules needed therefor are acquired. An individual data object is created for each loaded model. This data object is used to store the information loaded therefor. There is provision for a map that stores the different models for the respective use cases. The key used for this map is the unique use-case identifier. This specifies which model is supposed to be used for which signal. Each signal transmitted by the Java application holds the information regarding which use case this signal is needed for. Additionally, this unique identifier is used to attribute the stored information to the correct use case. As soon as a signal to be monitored has occurred in the car and the conversion of the Java application has been terminated (S5, "filter bus signals of the use case", S6, "interpret signals from bus data"), these signals are transmitted from the Java to the Python application (S7, "transmit signals to Python"). The use case required for the arriving signal is then loaded and passed on to the model for anomaly detection. The analysis is then performed. Before this method (S9) is called, the arriving signal is also prepared for the analysis by using the loaded information of the model. The length of time between the previous signal of the use case and the current one is calculated and normalized to a value between zero and one, as also during the training of the model. Furthermore, the respective signals and the values thereof are mapped to the numerical values used for training. In addition, the characteristic of the signals is stored in a so-called stack. This stack manages the last signals that have arrived. The different signal properties of the signals occurring one after the other are each delivered to the defined stack. The maximum number of attribute values is set during the initialization already. If the maximum number of elements has been reached, then, the first time, a forecast for the anomaly detection is initiated, since the model requires this information about the preceding signals in order to be able to make a statement about the plausibility of the next signal. Moreover, as soon as a further signal arrives, the attributes of the oldest signal are removed from the different stack objects and the newly arrived signal is put first. This method guarantees that only the last x signals ever affect the prediction. By way of illustration, the data are stored for a period of five signal attributes. Additionally, the implementation as a stack reduces the management effort, since the older objects are automatically removed when new signal attributes for the stack objects are added. After the analysis has been performed, the result is returned for the respective signal. This involves not only the calculated anomaly score but also further information, such as the predicted signal and the signal that has actually occurred, being transferred. This information is then transferred from there to the Java application (S10, "transmit results of the AD to computer center"), which automatically transmits them to the BMW computer center (S11, "transmit result to computer center"), for further processing (S12).

The application 1*a* is the Java development that runs on the MDR and filters the bus signals occurring on the MDR according to the signals required (S5, "filter bus signals of the use case") and then converts these binary signals, using the conversion rules required therefor, into regular messages that have the same structure as the training data of the models (S6, "interpret signals from bus data"). The Java development for the anomaly detection consists of multiple different program parts. There are already applications produced in Java that perform different tasks on the MDR. So as now to be able to incorporate a new application into this existing framework, the application described below is started from this already existing framework. The actual anomaly detection application is started. This moreover involves still further important information being defined for the application. First, the signal filters are defined, which check all of the signals on the MDR according to those that are relevant to the anomaly detection. The filtered signals are forwarded to the actual anomaly detection (S7, "transmit signals to Python") and used for analysis. Additionally, the service that receives the results of the anomaly detection from the Python application and then transmits them to the BMW computer center by LTE (S11, "transmit results to computer center") is started. A central service coordinates the different tasks. At the beginning of the application, a configuration file is received in which the different signals that are significant to the anomaly detection are defined. An object is created for each defined signal. Said object is used to store the different information from the transmitted configuration file. In the next step, a further object is then created for each object by using an SQL-Lite database. This SQL-Lite database contains the so-called vehicle electrical system catalog. This is used for central storage of all of the information about the different signals that can occur on the bus systems in the car. This database is used to convert the signals received in the individual messages from said messages. After a further object has been generated for each object, the different messages can now be converted using the stored information from the. The same signals as are also available for training the models are now produced. If a bus message now arrives on the MDR, it is interpreted using the conversion rules stored for this message and a further object is created. This then contains all the specific information needed for the subsequent analysis of the signal. The newly generated object is then transmitted using socket communication to the Python application for anomaly detection (S7). After the anomaly detection has analyzed the different signals (S9), the result of the individual analyses is transferred back to the Java application by using socket communication (S10). The main reason why this communication is performed using the Java application again and not directly from the Python program is that the communication between the MDR and the computer center is already realized on the Java application. It would then need to be specifically redeveloped once again for the Python application, which can be avoided by way of this procedure. The service for receiving the results is called directly from the Python application. In order to be able to ensure the quality of a DL model, not only the actual model but also the quality of the data available for the training is of great significance. For this reason, it is enormously important to be able to provide an adequate amount of training data, which are as different as possible, for training the model. In order to be able to ensure this, an application can be used to produce an unlimited number of items of training data from available data recordings that have been generated from real test drives by a multiplicity of motor vehicles and have been transmitted to the computer center for later analysis. The stored recordings about test drives that have been performed contain all of the messages that have occurred on the different bus systems in the car during the journey in uninterpreted form. These recordings are loaded and are converted into the individual signals using the information from the vehicle electrical system catalog. Training data for the different anomaly detection models can thus be produced from all of the test drives that are present and stored in the computer center. This ensures firstly that there are always sufficient training data available and secondly that said data can be compiled from different training journeys.

The basis for a successful DL method is formed primarily by the data. The quality of said data is crucial to the success and the accuracy of the model produced. This is also the reason why the data used should be cleaned up prior to actual use. Before the data can be used for the anomaly detection, they should therefore be conditioned.

This is used firstly to make sure of the actual processing of the data relating to performance, and also of a correct result. The available data are used to perform different actions relating to conditioning:

selection of the features to be used
dealing with missing values
linking features
scaling features
normalizing data
removing misleading data.

The individual steps for conditioning the data are described more accurately and explained below. These methods and the implementation options therefor always relate specifically to the use case of anomaly detection in vehicle data. The selection of the features required for the analysis is crucial for the entire model. However, they are also highly dependent on the use case to be analyzed. The features defined in this case of anomaly detection can be the signals to be observed. These again differ on the basis of their signal values. The unique combination of signal and signal value is defined as a feature. Moreover, the entire model is dependent on time. For this reason, the length of time between the successively occurring signals can likewise be considered to be a feature.

The data to be analyzed are internal vehicle electrical system communication in the vehicle. This logs all of the information about the current status of the vehicle and the current situation that it is in. Moreover, all actions initiated by the user of the vehicle are recorded. Since this information has considerable influence on the vehicle and the driver, there is a high probability of it being possible to ensure that this information exists completely and without data loss. Moreover, these signals can also contain safety-relevant information, which in turn guarantees that these data are relevant and consistent. These data are recorded at the operating time in the car and, following the performance of the test drive, read at the reading stations provided for that purpose and checked for their consistency and correctness. These checked data are then imported into a database and are now ready for analysis. The whole procedure can ensure that the data provided for training the model are complete and correct. For this reason, it is possible to dispense with cleaning up outliers when training the model. The same also applies for the actual analysis of the data on the MDR, since these data also resort to the same information source as the stored data. These are even tapped directly from the bus systems of the vehicle without buffer-storage of the data on the data memories of the computer center. In addition, the MDR checks the arriving signals for consistency and correctness before releasing them for further processing. This is also the reason why it is possible to dispense with eliminating missing values in this case of anomaly detection in vehicle data.

It is necessary to normalize data for any method of DL. If the data are not normalized, attributes having a higher definition range are rated much more strongly than features having a small definition range. This then results in these features having a greater influence on the result of the model than smaller ones. These decisions cannot be made by the data, but rather can be determined by evaluating the results of the individual models themselves.

The normalization of data is understood to mean that all of the data are mapped to a shared data area. The individual values are e.g.: each normalized to a value in the value range from 0 to 1. The normalization of the data values can be performed quite easily by calculating the difference between the maximum value and the minimum value for each individual feature. This minimum value is then attracted by each actual value and divided by the difference between the maximum and minimum values. The maximum value is thus mapped to the value 1 and the minimum value to 0. All data values situated in between are now mapped to a new value between 0 and 1 on the basis of their own value. Since the time between the successively occurring signals is crucial when analyzing the signals, this method is used to normalize these time ranges. It is not the actual timestamp of the signal that is normalized in this case, but rather the time difference between the successive signals, the so-called Δ time between a signal at the time n and a signal at the time n+1.

Feature discretization is used to map different features and the values thereof to smaller value ranges. This combines adjacent feature values into a shared category of the respective feature. The main aim of this function is to reduce the number of continuous attributes. If for example a value range of a numerical feature extends from 0 to 100, this value range can be split into an arbitrary number of categories. In this example, the value range could be split into ten subcategories of equal size. A feature value having the real value 13 would now be put into the same category as one having feature value 19. Using this method, the datasets lose accuracy overall. The aim must be to split the respective ranges such that the values contained therein can all be interpreted identically, meaning that they can be managed as one value. This loss of accuracy does not necessarily need to have adverse effects, but rather can certainly also have a positive effect on the respective analysis. First, the accuracy of the prediction model becomes better as a result of the simplification of the data. The model now no longer needs to predict an exact value, but rather just a range in which the predicted value will be. Secondly, the minimization of the value ranges for each individual feature can also shorten the length of the learning process and the actual analysis, and also simplify the entire model. The aim of this method is to define a minimum number of feature ranges that still accurately describe the available data, so that no important information is lost. It is necessary to bear in mind that the more different signals there are, the more complex is the prediction of the next signal. Is it useful to be able to accurately predict the speed of a vehicle to one decimal place or is this not necessary in such detail. In the case of anomaly detection, such accurate prediction is not useful and is more likely to lead to a deterioration in the result, since the anomaly detection then makes incorrect predictions more often. For this reason, the number of different signals is reduced. Each signal having a different signal value is considered as a separate signal in this case. This is implemented using the discretization methods.

In order to be able to use the event-based vehicle data for the anomaly detection model described, the data should also be adapted for the analysis. The bus communication in the vehicle takes place by means of messages. These individual messages always have the same structure and always contain the same signals with the current signal values. These signals of the individual messages are then analyzed using the anomaly detection model. It follows from this that all of the signals of a message occur at a shared time. If more than one signal from the message is now needed for analyzing the use case, these signals have the same timestamp and for this reason cannot be analyzed in chronological order, since the A time for the two signals is zero.

A prerequisite for the model used for analysis, however, is that this Δ time must never be zero, since this means that the signals can no longer be represented on the basis of time. For this reason, when analyzing signals of a message, the signals can always be alternated and it is therefore possible for only one signal of the message to be analyzed. By way of example, a message consists of four different signals. Of these four signals, four signals are needed for analyzing a use case, signal one thus being analyzed when the message arrives for the first time. As soon as the message arrives a further time, only signal two is analyzed. For the third arrival, signal one is then analyzed again. Using this mechanism, it is possible to analyze multiple signals of a message without a great loss of accuracy.

Anomalies or outliers are the two most frequent terms used in connection with the detection of anomalies. The reason that anomaly detection is important is that anomalies can occur in any form of data communication. This may involve extremely important information that can no longer be evaluated correctly as a result of the anomalies. As such, for example an abnormal network communication pattern in a computer network could mean that a hacked computer transfers sensitive data themselves to an unauthorized destination. Irregularities in the transaction data of credit cards can indicate credit card or identity theft, or abnormal measured values from a sensor of a vehicle can mean an error in the component of the vehicle. The detection of outliers or anomalies in datasets was examined in the field of statistics in the 19th century already. Since this time, various techniques for detecting anomalies have been developed with the aid of different research communities. Many of these different methods have been developed and optimized specifically for a certain field of application. Only over time were generic methods for outlier detection developed more and more. This development was again driven forward considerably by the further development of new possibilities with regard to ML and artificial intelligence (AI).

The initial idea of anomaly detection is formed by the correct prediction of the next signal in the vehicle.

Different use cases describing the signals to be monitored are defined in this instance. If one use case involves the definition that the speed signal is supposed to be monitored, for example, then as soon as a speed signal is tapped from the bus systems on the MDR an attempt is made to predict this signal with the current value. If the predicted signal and the signal that is actually present then match, the behavior of the vehicle is categorized as normal. This means that the signal and the signal value thereof have been correctly predicted by the model and the vehicle is therefore in a state that was forecast by the model and that has been learned as a normal state on the basis of the training data of the model. If, however, a different signal is predicted, then this is a first indication of a behavior that the model does not know and is therefore categorized as abnormal. Naturally, an abnormal behavior does not result from every incorrectly predicted signal. However, an increased occurrence of incorrect forecasts results in the analyzed signals no longer being able to be considered normal. For this reason, the whole vehicle status, at this particular time, should be looked at more precisely. The result of the model accordingly provides a very good assessment of the current situation of the vehicle.

If a different signal than that forecast by the model occurs increasingly, then the vehicle status at this particular time needs to be looked at more precisely. The main component of the approach on which the model is based is formed by a recurrent neural network (RNN). This RNN is extended using long short-term memory (LSTM), which is used in this model as memory for the signals that have already occurred. These already past signals, and the time between the individual signals, are of the very greatest significance for the prediction probability of the next signal. For this reason, the RNN was extended by the components of an LSTM. Since the signals to be analyzed occur at very short intervals of time and moreover the prediction is performed on limited hardware during the journey in the vehicle, the gated recurrent unit (GRU) variant, a simplified form of LSTM, is used, since this variant requires similarly good results for a lower power consumption. As a further component of the model, the Dirichlet model (Dir-M) is used to process the result of the RNN. The result of the RNN forms a probability distribution for the individual signals over time. Dir-M is used to apply the result of the RNN to the signals to be analyzed. This then results in a probability distribution at the current time of the signal to be analyzed with the probability of the occurrence of every single signal. From this set of information, the signal having the highest probability at this time is then ultimately output by the model as the predicted signal.

So that the model for anomaly detection can be used in the vehicle, other components besides the two applications 1*a*, 1*b* described also need to be provided on the MDR. One of these components is Tensorflow. Tensorflow is a Python-specific framework that different libraries and components for the development of DL applications from ML known, and provided a large bandwidth on different components. For this reason, this framework was also used for implementing the anomaly detection model. In order to be able to execute the model trained for the respective use cases on the MDR too, this framework is also needed in the vehicle. It should be borne in mind that the actual training of the prediction model is not performed on the target device on which the application is later executed in the vehicle, but rather the training of the application is performed specially on a computer provided for that purpose. Since the training of the models is also associated with considerable effort and increased computing capacity, this training is not carried out on the central processing unit (CPU) either. For performance-related reasons, these calculations are carried out on the GPUs of the workstation that are provided for that purpose, since these can act more powerfully and more quickly for this type of calculation.

The anomaly detection is performed on the MDR installed in the vehicle. The relevant wiring there makes the connection to the different bus systems in the car. By way of these connections, the messages of the individual bus systems are transferred to the MDR and processed further. Moreover, the MDR is supplied with power by means of the vehicle electrical system in the vehicle. In addition, the MDR comprises antenna connections that are needed for different components in the vehicle. As a result, the radio connections in the vehicle can be positioned at a better location by using the antennas, allowing better implementation of the reception, and also the transmission power, of the data. There is provision for connections for a GPS module, two LTE components, a WLAN and a BTLE connection.

At present, diagnostic signals are sent in the vehicle automatically. These are automatically produced by various systems in the vehicle. They are used primarily for logging and for checking the functionality. This information is not safety-critical information. It is important for diagnosing errors or undefined vehicle situations and continuously provides important status reports about the state of the vehicle components during the journey. These are unimportant for a smooth journey, however, and are used only for the subsequent evaluation.

This use case is used to monitor the occurrence of diagnostic signals. If diagnostic signals are sent increasingly, this has an adverse influence on all of the bus communication in the vehicle, since said signals contain no vehicle-critical information and are used only for evaluating the applications. As a result, the bus system in the car is burdened by unnecessary data. It has already happened that an increased bus load in the vehicle led to a complete breakdown of vehicle communication during the journey. This meant that the vehicle was then no longer able to be moved and had to be towed away. This incident was caused by an erroneous software version on a control unit that was responsible for sending the diagnostic signals. This erroneous behavior of the diagnostic signals did not become apparent during testing of the software, since no comparison with an earlier version, or with normal diagnostic signal behaviors, was performed. The reason for this is firstly that diagnostic signals are rarely tested, since they contain no safety-critical information and are actually used only for analytical purposes. Moreover, assessing normal and abnormal diagnostic behavior is extremely difficult. Moreover, the diagnostic behavior can be influenced by the interaction of different components. This interaction of the components used and of the different software versions thereof can usually be tested in combination only in the test vehicles. To be able to perform this procedure in automated fashion, the anomaly detection application is used to learn the behavior of diagnostic signals. This learnt model is then used to validate the diagnostic behavior in the vehicle and to check for unexpected and increased diagnostic behavior. The aim of this use case is thus to monitor the diagnostic signals to ensure firstly that they occur in a normal number and secondly that they occur in a known and learnt sequence.

When creating a new use case, several actions need to be performed before the created model can analyze the data in the vehicle. A total of five different steps need to be performed:

Before it is possible to begin the actual analysis of the signals, the signals that are supposed to be monitored for this use case first need to be defined. These are clearly defined using the BusId, FrameId and SignalName. The configuration of these signals is stored in a file. When the application starts, this configuration file is transmitted to the Java application in the MDR and the signals required for the anomaly detection are defined. The configuration comprising FrameId, BusId and SignalName is unique for each signal. The configuration is also used for filtering the bus signals. This guarantees that only the defined bus signals are interpreted and forwarded from the MDR to the anomaly detection application. Moreover, a separate key is defined for each new use case. This key can be used in the subsequent steps to associate the signals to be analyzed with the respective use cases. This key needs to be uniquely associated with the use case.

In the next step, training data are created for the model that is to be created. The stored binary data from vehicle journey recordings are exported from a database and then converted into messages and signals using the conversion rules. Essentially the same process as is also performed by way of the application 1*a* described above when converting the binary bus signals on the MDR is carried out. Again, only the signals that are significant to the use case are converted in this case too. All other signals are disregarded for creating the training data, and for this reason are also not converted. The exported data from the database and also the stored conversion rules and the defined signals are used to create a new file for the exported data. This file contains all the signals necessary for training the data. In order to be able to provide data for the training that comprise preferably all vehicle situations, the training data for the model are created from multiple single test drives by different vehicles. Different areas of the test drive are selected in each case and combined into a file. This file containing training data then models not just one vehicle with one test drive, but rather forms an average for multiple test drives from different vehicles. As a result, the behavior is learned not only on the basis of one vehicle and one test drive, but rather by way of a multiplicity of different journeys and vehicles.

After the use case to be analyzed has been defined and enough training data have been generated, the base model is used to develop the model specifically for the configured use case. The base model is trained using the created training data for different model configurations. The model is trained in different epochs. After each epoch, in which the internal weights of the RNN were adapted, the model is evaluated using data that are unknown to it, the so-called validation data. After a defined number of maximum epochs, the training of the model is terminated. This is performed for different model configurations in succession. First, the different parameters and the possible allocation thereof are defined. Next, the actual search for the hyperparameters is then started. For each parameter, a for-loop is defined in which the individual allocations of the parameter are processed. A parameter list is then compiled for each combination of allocations. Said list includes all of the parameters of the model and is then delivered to said model for execution. The model is now executed with this configuration and returns values for the result of the model. These results, together with the model configuration used, are then stored in a file. This file is extended by a data row for every parameter allocation with which the model has been trained.

Besides the results, the created model with the individual weightings between the nodes used and also additional information about the model and visualizations are also stored. These data can then be analyzed in addition. At the end of the hyperparameter search, all the results with the respective configurations are stored in a file. This file can then subsequently be analyzed. It is sorted on the basis of the results of the model. The model having the best result and also the associated model configuration are selected. In the data additionally stored for the model, the learnt model with the learnt weightings between the individual nodes is then ported to the MDR and stored for the use case as the model that is to be used.

After the best model configuration for the use case has been found using the hyperparameter search, the created model is now ported to the MDR. This involves not only the actual model but also further information defined during the training of the model being ported. If various signals and the values thereof were discretized during the training, these signals also need to be rendered into the values used during the training for the analysis on the MDR. These discretization rules are stored in a folder with the unique use-case identifier, just like the learnt model. Each arriving signal is associated with at least one use case by way of its configuration. The model is defined using the use case and a new model object is generated. The information provided is then used to load the trained model for the use case. In addition to the model, the discretization rules and also further important information for processing the signals are also loaded for the model analysis. This loaded information is additionally also used to define important parameters for the model that require the loaded information. For example the stacks for the delivery parameters already described are defined for the model with the maximum length. This length defines the maximum number of signals that the model uses to predict the next signal. Moreover, the maximum and minimum times between two successive signals are loaded. Besides, the two values are needed for normalizing the time difference between the signals that occur. This guarantees that the time difference during the analysis on the MDR is normalized to the same values as for the training of the models. If a signal is now forwarded from the MDR to the application, the parameter that is also delivered, which defines the use case, is used to load the model needed for the signal and to pass on the signal to be analyzed to the model for further processing. A decision is then made there for each initial situation as to whether the minimum number of required signals has already been reached and whether a prediction can be made for the time period of the newly arrived signal. If the minimum number of signals for a prediction has not yet been reached, the arriving signal with the normalized time difference in relation to the previous signal is only added to the stacks and the prediction is not called. The method used for predicting the model involves tensor objects of the model first being loaded and then filled using the current stack. These tensor objects now filled are delivered to the prediction model. The signal predicted by the model, and the probabilities of each individual signal, are then returned as the result of the model. These are subsequently needed for categorizing the result. After the prediction has been made, the result of the model is evaluated using a so-called anomaly score.

The anomaly score states how normal, or abnormal, the current behavior of the vehicle is. Every signal that the model analyzes affects the anomaly score. Two different variants of anomaly scores are conceivable in this case.

The simplest variant in order to be able to make a statement about the current state of the vehicle is simply summing the incorrectly predicted signals. The incorrectly predicted signals are summed over a specific number of signals in this case. For example, if precisely 25 of the last 100 signals are predicted incorrectly, then the current anomaly score of this model has the value 25. Similarly, the same variant also exists using a weighting of the time component. In this case, signals that are further ago in the past are given a lower weighting than signals that have only just been incorrectly predicted. For example, the last 100 signals are again used for calculating the anomaly score. These are weighted according to their time characteristic. If for example the current signal is predicted incorrectly, this is also taken into consideration with the weighting of one for the anomaly score. If 10 signals are now predicted correctly, however, then the weighting of this incorrectly predicted element changes constantly. It then loses significance, and after 10 correctly predicted signals it now only has the weighting of 90/100 for the current anomaly score. This is an attempt to better represent the current situation of the vehicle. It prevents a vehicle situation in which the model has predicted the last 50 signals correctly but has made 20 incorrect predictions before these 50 signals from being rated in exactly the same way as if the model has incorrectly predicted the last 20 signals in succession. Without weighting the time, these two very different situations in the vehicle would be defined by an identical anomaly score. To avoid this, the temporal weighting of the anomalies was added.

Moreover, besides the anomaly scores, further information is also transferred to the computer center. This additional information is used for further accurate analysis. It is possible to assess how incorrect the prediction of the model was. If a different signal than the applied signal is now predicted, this is not always synonymous with an anomaly. The preceding signals likewise need to be considered in this case. If the prediction of the model is not correct over a longer period, then there is the probability of an abnormal behavior, or of an abnormal vehicle situation. For this situation, the calculated anomaly scores will also assume an increased value. In order to be able to monitor the calculated anomaly scores automatically, an individual limit value can be defined for each use case and for each anomaly score. This then defines the value of the anomaly score from which the behavior of the vehicle is categorized as abnormal and when it is still a normal behavior. After all of the aforementioned points have been processed, the use case can now be successfully implemented on the MDR. This involves the defined signals being monitored. If an abnormal behavior now occurs in these signals, this can be identified on the basis of the anomaly scores. It is subsequently possible to examine the vehicle data pertaining to this specific time of the abnormal data more precisely and to ascertain the reason for the abnormal behavior. For this, it is now no longer necessary to examine all of the data from the test journey, but rather it is sufficient for the data pertaining to the time at which an abnormal behavior was discovered with the aid of the anomaly scores to be examined more precisely. This not only saves time for the analysis but also reduces the computing capacity required.

LIST OF REFERENCE SIGNS

1 apparatus
2-5 component
6 vehicle bus
10 vehicle
20 computer center
100 system
B, B* operating data (filtered*)
D, D* measurement data (filtered*)
F vehicle function
M model data
V comparison data
A abnormal operating state
a1)-f) program steps

The invention claimed is:

1. A method for detecting abnormal operating states of a motor vehicle, comprising the steps of:

a) receiving model data at the motor vehicle from an external computing device, the model data representative of operating states to be expected for at least one component, the model data including parameters of an artificial neural network and generated at least in part based on operating data provided to the computing device by a plurality of motor vehicles, b) collecting measurement data, the measurement data representative of an actual operating state of the at least one component, c) ascertaining within the vehicle comparison data on the basis of the parameters of the artificial neural network of the model data and the measurement data, the comparison data representative of an expected operating state, d) using the comparison data and the measurement data as a basis for determining whether there is a discrepancy between the actual operating state and the expected operating state during operation of the motor vehicle, and e) responsive to determining the discrepancy, attributing an abnormal operating state to the at least one component in a manner corresponding to a time of collection of the measurement data on the basis of the discrepancy.

2. The method as claimed in claim 1, further comprising specifying a vehicle function to be evaluated to the motor vehicle before step c), using the vehicle function to be evaluated and the measurement data as a basis for ascertaining filtered measurement data, and using the filtered measurement data to ascertain the comparison data in step c).

3. The method as claimed in claim 1, wherein steps b) to d) are each performed at multiple successive times, and if a discrepancy between the actual operating state and the expected operating state is ascertained at each of at least N successive times, the abnormal operating state is attributed to the at least one component in a manner corresponding to the N successive times in step e), N being a natural number greater than 1.

4. The method as claimed in claim 3, wherein N is greater than 5.

5. The method as claimed in claim 3, wherein N is greater than 10.

6. The method as claimed in claim 1, further comprising:

f) if the abnormal operating state is attributed to the at least one component, storing and/or outputting the measurement data after step e).

7. The method as claimed in claim 1, wherein step a) further comprises:

providing operating data of one or more motor vehicles to the computing device, specifying a vehicle function to be evaluated to the computing device and filtering the operating data on the basis of the vehicle function to be evaluated, ascertaining model data by training a model on the basis of the filtered operating data for the vehicle function to be evaluated, and providing the ascertained model data to the vehicle.

8. The method as claimed in claim 1, further comprising:

f) transferring the measurement data to the computing device.

9. The method as claimed in claim 1, wherein the artificial neural network is a deep neural network.

10. An apparatus for detecting abnormal operating states, wherein the apparatus is configured to perform the method as claimed in claim 1.

11. The method as claimed in claim 1, wherein step c) further comprises:

c) ascertaining the comparison data includes performing at least one of the group consisting of: a distance-based method; and a reconstruction-based method.

12. A system for detecting abnormal operating states of a motor vehicle, comprising a computer center and a motor vehicle, the motor vehicle having an apparatus configured to perform the method as claimed in claim 1.

13. The system of claim 12 wherein the computer center is further configured to:

obtain operating data of one or more motor vehicles to a computer center, specify a vehicle function to be evaluated to the computer center and filter the operating data on the basis of the vehicle function to be evaluated, ascertain model data by training a model on the basis of the filtered operating data for the vehicle function to be evaluated, and provide the ascertained model data to the motor vehicle.

14. A non-transitory computer readable storage medium containing a computer program comprising instructions that, when the computer program is executed by way of a computer, cause said computer to perform the method as claimed in claim 1.

* * * * *